United States Patent
Klaassen et al.

(10) Patent No.: US 7,283,377 B2
(45) Date of Patent: Oct. 16, 2007

(54) METHOD FOR CONTROLLING FIRING ANGLE UNDER LINE DIP SITUATIONS

(75) Inventors: Hendrik Hans Addi Klaassen, Ebikon (CH); Urs Roth, Ebikon (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 229 days.

(21) Appl. No.: 10/656,989

(22) Filed: Sep. 5, 2003

(65) Prior Publication Data

US 2005/0068797 A1   Mar. 31, 2005

(51) Int. Cl.
*H02H 7/125* (2006.01)
(52) U.S. Cl. .......................................... 363/52; 363/125
(58) Field of Classification Search ................. 363/52, 363/53, 54, 85, 87, 88, 125, 127, 128, 129
See application file for complete search history.

(56) References Cited

U.S. PATENT DOCUMENTS

| 4,511,835 | A | * | 4/1985 | Studtmann | 318/700 |
| 6,055,167 | A | * | 4/2000 | Shamkovich et al. | 363/52 |
| 6,385,066 | B1 | * | 5/2002 | Garces et al. | 363/87 |

\* cited by examiner

*Primary Examiner*—Jessica Han
(74) *Attorney, Agent, or Firm*—Quarles & Brady LLP; Alexander M. Gerasimow

(57) ABSTRACT

A method and apparatus for converting AC power into DC power are disclosed, where the method includes receiving the AC power, and converting the AC power into the DC power by way of a rectification device, where the rectification device is capable of being controlled to switch on at a plurality of time instants. The method further includes experiencing at least one of a first reduction in a first characteristic of the received AC power and a second reduction in a second characteristic of the DC power; and changing at least one of the time instants at which the rectification device is to be switched on.

31 Claims, 2 Drawing Sheets

METHOD FOR CONTROLLING FIRING ANGLE UNDER LINE DIP SITUATIONS

CROSS-REFERENCE TO RELATED APPLICATIONS

FIELD OF THE INVENTION

The present invention relates to power converters, and more particularly to AC-to-DC power converters that employ controlled switching devices to govern the power conversion (rectification) process.

BACKGROUND OF THE INVENTION

Power converters for converting AC power, such as 3-phase AC power, into DC power are well known. Commonly, such AC-to-DC power converters operate by controlling rectification devices such as power thyristors/silicon-controlled rectifier (SCRs) so that the devices alternately allow current to flow and preclude current from flowing between a given AC input line and the DC output lines. Such converters allow for a significant amount of control over the power output insofar as the SCRs can be controlled to switch on to conduct current (e.g., "fired") at a variety of time instants (e.g., at a variety of "firing angles").

A problem faced by conventional power converters is that, under certain circumstances, rapid changes in the input voltage without corresponding adjustments performed by the power converters themselves can result in excessively high current being drawn from the line (and eventually provided to a load). Such excessive "inrush currents" in particular can arise subsequent to unexpected, significant drops or "dips" in the AC input power level (or a characteristic of the AC input power, such as the voltage level of the input power). Such dips in the AC input power, or even total loss of power, can occur for a variety of reasons such as inclement weather, load imbalances, line malfunctions, or other reasons. When such dips in the AC input power level occur but then the AC input power recovers, the recovery of voltage can result in a significant inrush current to the power converter (and also eventually to the load), which can be damaging to the power converter and lead to undesired shut-down of the connected load.

A need therefore exists for an improved AC-to-DC power converter. In particular, a need exists for an improved AC-to-DC power converter capable of providing power conversion (e.g., by adjustment of the firing angle of semiconductor switching devices in the converter) and also, during the power conversion process, capable of responding to drops in the AC input power level in a manner that reduces or mitigates any inrush currents that can occur when the AC input power recovers.

BRIEF SUMMARY OF THE INVENTION

The present inventors have recognized that conventional AC-to-DC power converters that employ firing angle control nevertheless do not typically adjust the firing angle of the semiconductor switching devices (for example, SCRs or IGBTs) when dips in the AC power level occur. Further, the present inventors have recognized that certain adjustments to the firing angle(s) of the semiconductor switching devices subsequent to dips in the AC power level can limit or mitigate the amount of inrush current than occurs upon the recovery of the AC power level.

In particular, the present invention relates to a method for converting AC power into DC power that includes receiving the AC power, and converting the AC power into the DC power by way of a rectification device, where the rectification device is capable of being controlled to switch on at a particular time instant. The method further includes experiencing at least one of a first reduction in a first characteristic of the received AC power and a second reduction in a second characteristic of the DC power, and changing at least one of the time instants at which the rectification device is to be switched on.

The present invention further relates to a power conversion apparatus that includes an AC power input port, a DC power output port, and a rectification component coupled between the AC power input port and the DC power output port, where the rectification component includes at least one switchable device that is capable of being controlled to switch on at a plurality of time instants. The power conversion apparatus further includes a control device coupled to the rectification component that determines the time instants and controls the switching on of the at least one switchable device to occur at the determined time instants, where the control device receives information concerning at least one of a first characteristic of the AC power input and a second characteristic of the DC power output, and where the control device adjusts the time instants at which the switching on of the switchable device occurs.

The present invention additionally relates to a method of power conversion comprising setting a firing angle for a switching device, monitoring a DC output voltage level, adjusting the firing angle if the DC output voltage level falls excessively, and returning the firing angle to a normal level if one of the DC output voltage level and an AC input voltage level returns to a level that is at least three-quarters of a respective normal level.

The present invention further relates to a method of controlling a power converter. The method includes monitoring a first characteristic associated with at least one of an AC input power and a DC output power, and advancing a switch-on time of a switching device in response to a reduction in the first characteristic.

DETAILED DESCRIPTION OF THE INVENTION

Figure 1:
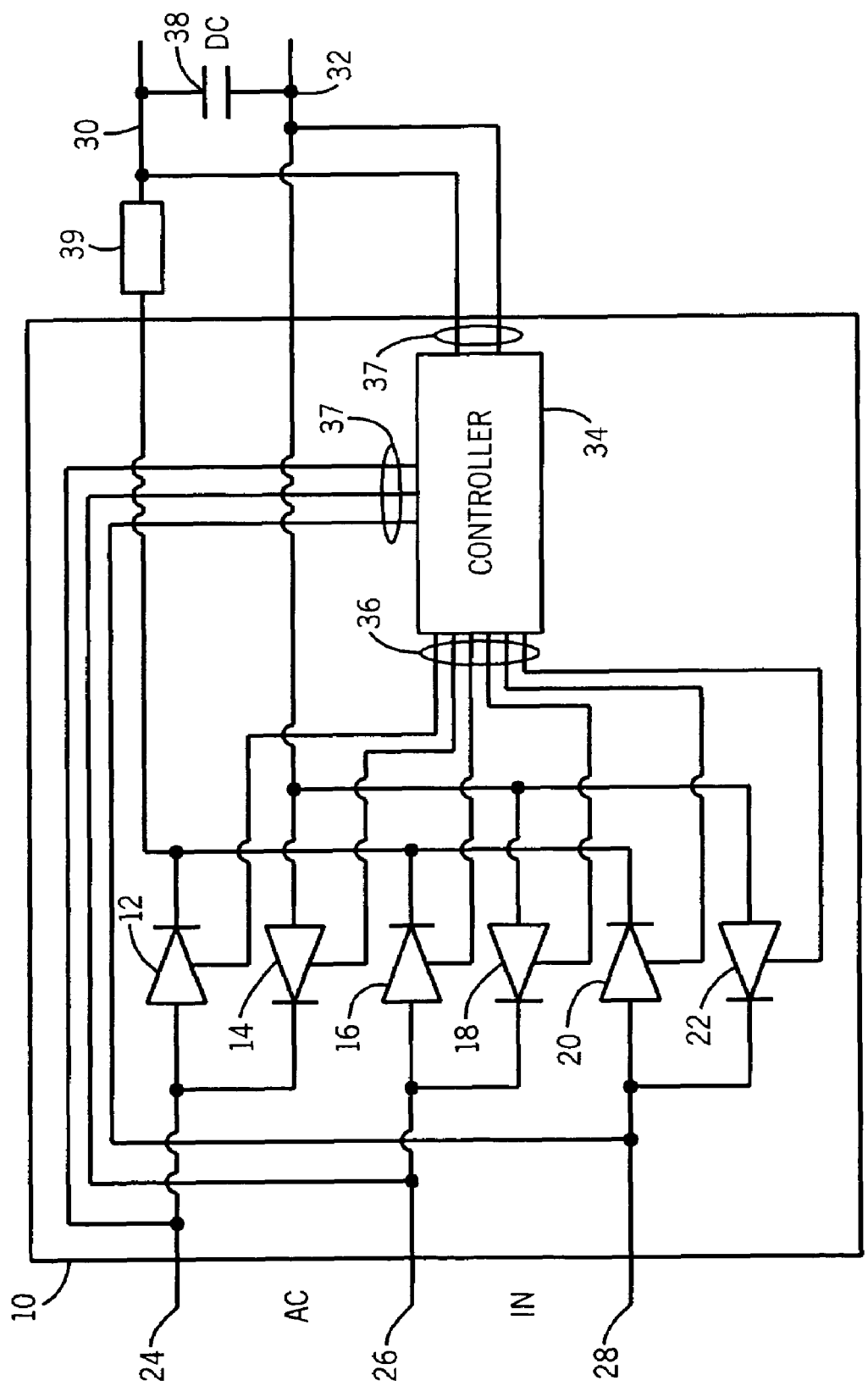
FIG. 1 is a schematic diagram of an exemplary (in this example, SCR-based) AC-to-DC power converter capable of performing firing angle adjustment in accordance with one embodiment of the present invention.

Referring to FIG. 1, a schematic of an exemplary AC-to-DC power converter 10 is provided in which the power converter has first, second, third, fourth, fifth and sixth rectification devices 12, 14, 16, 18, 20 and 22, respectively. The first, third and fifth rectification devices 12, 16 and 20 are coupled between first, second, and third AC input lines/terminals 24,26 and 28, respectively, and a first DC output line/terminal 30, while the second, fourth and sixth rectification devices are coupled between the three AC input lines/terminals and a second DC output line/terminal 32. In the embodiment shown, each of the rectification devices 12–22 are power thyristors/silicon-controlled rectifiers (SCRs); however, in alternate embodiments, other rectification devices can also be utilized such as Insulated Gate Bipolar Transistors (IGBTs), Gate Turn-offs, other semiconductor switching devices and other switching devices. The operation of the SCRs 12–22 is controlled by one or more internal or external control device(s) represented, in the present embodiment, by an exemplary controller 34. The controller 34 controls the operation of the SCRs 12–22 by way of firing signal lines 36 connected between the SCRs 12–22 and the controller. Additionally, the controller 34 in the present embodiment is able to sense the voltages existing at the AC input lines 24–28 and the DC output lines 30,32 by way of sensing lines 37. In one embodiment, the power converter 10 can be a Power Flex 700 pre-charge controller manufactured by Rockwell Automation of Dierikon, Switzerland.

As is well-known in the art, the SCRs 12–22 of the power converter 10 typically operate as follows. As three phases of AC power are applied to the respective AC input lines 24–28, AC voltages are applied across the SCRs 12–22. When the voltage occurring across a given SCR is positive (but not negative), the SCR can be caused to "fire" or conduct current upon the provision of an appropriate signal from the controller 34 at a particular time instant. Once the SCR is conducting, the SCR remains "on" (e.g., it continues to conduct current) until such time as the voltage occurring across the SCR becomes zero or negative, at which time the SCR shuts off. The SCR then remains off until such time as it again is experiencing a positive voltage across it and it receives a firing signal from the controller 34. Because the controller 34 can cause each of the SCRs 12–22 to fire at any of a variety of times (e.g., at any time during the half cycle of the AC signal provided to a given SCR when the voltage across that SCR is positive), the controller 34 has a significant degree of control over the magnitude of the DC output voltage that is provided at the DC output lines 30,32. Additionally, as discussed in further detail with reference to FIG. 2, in accordance with the present invention the controller 34 is also able to control the SCRs 12–22 in a manner that controls or limits the amount of inrush current that flows into the power converter 10 via the AC input lines 24–28, particularly following interruptions in the power supplied to the AC input lines 24–28.

Figure 2:
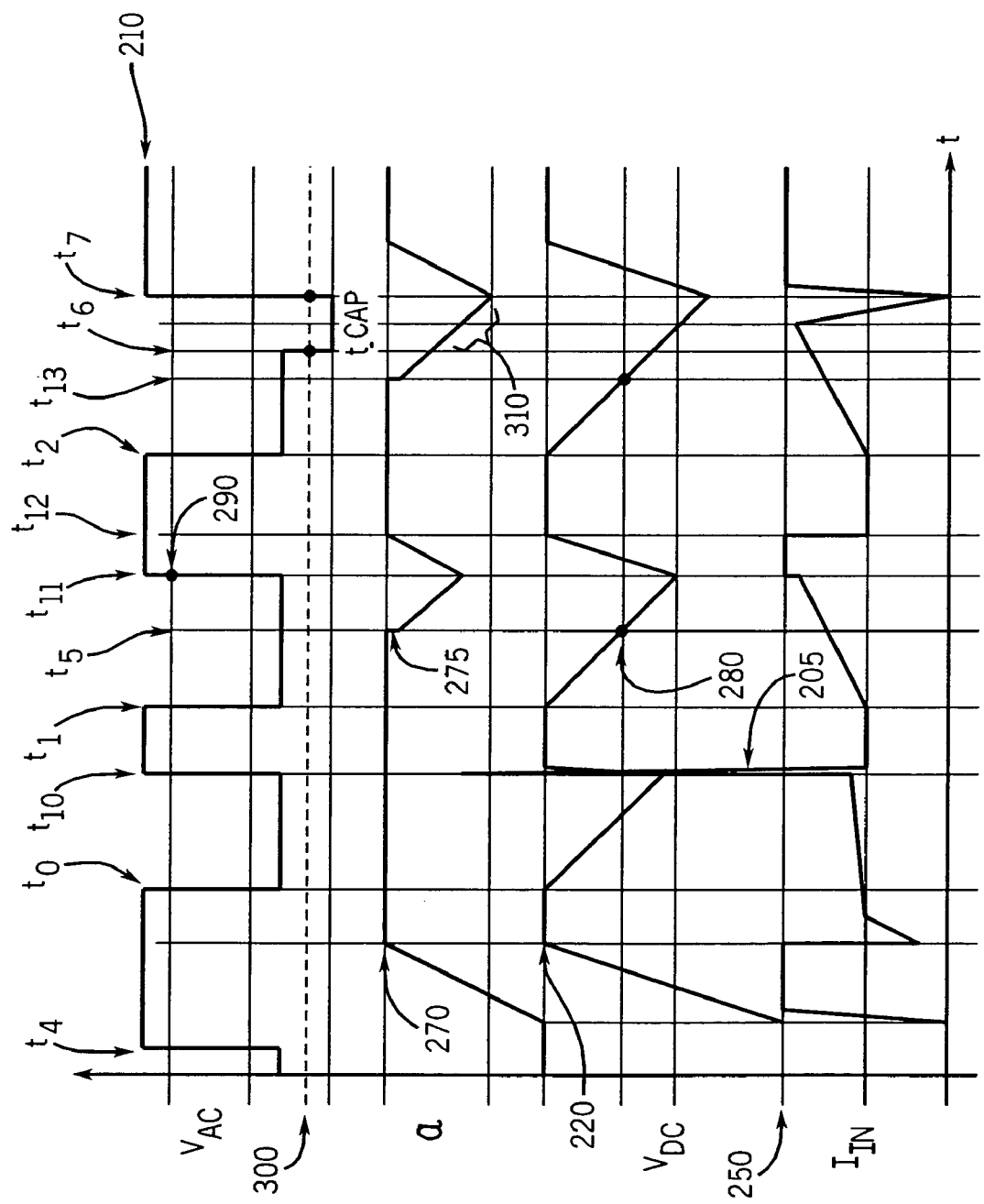
FIG. 2 is a timing diagram showing exemplary operation of the AC-to-DC power converter of FIG. 1 involving firing angle adjustment.

Referring to FIG. 2, exemplary operation of the power converter 10 of FIG. 1 over time in response to a time-varying AC input voltage $V_{AC}$ is shown, in terms of a DC output voltage $V_{DC}$, a firing angle α, and an input current $I_{IN}$ representing the current received by way of the AC input lines 24–28. To simplify the illustration provided in FIG. 2, the AC input voltage $V_{AC}$ shown in FIG. 2 more specifically is a time-average magnitude or root-mean-squared (RMS) voltage level of one or more (e.g., three) sinusoidal voltages that are provided at the AC input lines 24–28 of the power converter 10. That is, the AC input voltage $V_{AC}$ shows the time-variation of the overall magnitude of the sinusoidal voltage(s) applied to the power converter 10, rather than the actual, sinusoidal time variation of the voltage signals. Likewise, the input current $I_{IN}$ is a time-average magnitude or root-mean-squared (RMS) current level of one or more (e.g., three) currents that are provided at the AC input lines 24–28 of the power converter 10.

The firing angle α of the power converter 10 is representative of the point at which a given one of the SCRs 24–28 is fired or commanded to turn-on relative to some other phase reference point associated with the AC signal being provided to that SCR, for example, a number of degrees of phase relative to the crossover point of the phase being provided to that SCR relative to another one of the phases (e.g., natural commutation point). Typically, in three-phase power converters such as the power converter 10, each of the SCRs has the same firing angle value at any given time. However, this is not necessarily the case; that is, it is possible that (in certain embodiments) a power converter employing multiple SCRs would apply different firing angles to different SCRs. Further, while the same firing angle is typically applied to each of the different SCRs in a multiple-phase power converter, this does not mean that each SCR is fired at the same time. Rather, each SCR fires at a different time instant because the three voltage signals applied at the three AC input lines are each 120 degrees out of phase with one another and because the two SCRs connected to each AC input line are in reversed polarity (such that the two SCRs of each pair fire at times that are 180 degrees apart from one another in phase). It will be understood to those of skill in the art that controlling the switching of SCRs (or other controlled switching devices) based upon firing angles (or other quantities representing phase) is equivalent to controlling the switching of those devices to occur at particular time instants. In particular, certain other switching devices such as IGBTs will be both switched on and switched off at specific times. Consequently, with respect to those devices, it often is more convenient to speak of firing those devices (and/or turning them off) at specific time instants.

As shown in FIG. 2, upon being switched on at a switch-on time $t_4$, the AC voltage $V_{AC}$ of the AC input power provided to the power converter 10 usually has a normal level 210, but at times $t_0$, $t_1$ and $t_2$ falls below the normal level. The power converter 10 converts the AC power input into a DC power output having the DC output voltage $V_{DC}$, which is generally controlled to have a normal level 220. The power conversion process, and level of the DC output voltage $V_{DC}$ depends upon the load, upon the AC voltage $V_{AC}$, and upon the firing angle ax of the SCRs 12–22 of the power converter 10, as determined by the controller 34. During normal operation subsequent to the switching on of the AC voltage $V_{AC}$, the firing angle α is also controlled to be at a normal level 270, which can vary depending upon the embodiment and the type of power control that is desired.

Operation of the power converter 10 in a conventional manner (not employing the present inventive method involving firing angle adjustment to limit inrush current as discussed further below) is shown in FIG. 2 in response to the dip in the AC voltage $V_{AC}$ at time $t_0$. As shown, the power converter 10 does not adjust the firing angle α in response to the dip at time $t_0$. Consequently, while the dip is occurring, the DC output voltage $V_{DC}$ falls at a relatively slow rate and then, when the dip has ended at a time $t_{10}$, the DC output voltage $V_{DC}$ rapidly recovers. As shown, when the dip ends at time $t_{10}$, and the DC output voltage $V_{DC}$ is recovering, the input current $I_{IN}$ experiences a sudden, significant increase constituting an inrush current spike 205, which is well above a rated current level 250 and could potentially damage certain components within the unit or related to the installation.

In accordance with the present invention, the firing angle α of the SCRs 12–22 is adjusted by the control circuit 34 to approximately limit the input current $I_{IN}$ to the rated current level 250 when, due to variation in the AC voltage $V_{AC}$, there is a tendency for there to be large inrush currents. Such operation is shown in FIG. 2, subsequent to time $t_1$. As shown, at time $t_1$, the AC voltage $V_{AC}$ drops suddenly and significantly, and consequently the magnitude of the DC output voltage $V_{DC}$ begins to drop off. The level of the DC output voltage $V_{DC}$ typically does not fall as rapidly as the AC voltage $V_{AC}$ because of the inductance 39 and one or more capacitors 38 that can be coupled at the output of the power converter (e.g., between DC output lines 30 and 32 of FIG. 1). Nevertheless, the DC output voltage $V_{DC}$ drops and, because the dip in the AC voltage $V_{AC}$ is continuing, eventually reaches a first threshold 280 at a time $t_5$. The controller 34, which detects the DC output voltage $V_{DC}$ by way of the sensing lines 37, enters a protective mode of operation upon determining that the DC output voltage $V_{DC}$ has fallen below the first threshold 280.

In the protective mode of operation, the controller 34 continually recalculates the firing angle α. In a preferred embodiment, the firing angle α is calculated using the following general equation:

$$\alpha = a\sin((k1*A)/(k2*B)) \quad (1)$$

where the variable A is the actual value of the DC output voltage $V_{DC}$, and the variable B is a heavily-filtered value of the AC voltage $V_{AC}$. Additionally, k1 and k2 are scaling factors that are used to improve computation accuracy and adapt variable ranges/magnitudes to each other, as is known to those of ordinary skill in the art (and which will vary depending upon the particular implementation). Consequently, upon the controller 34 entering the protective mode of operation, the controller 34 controls the firing angle α of the SCRs 12–22 to generally track the sensed value of the DC output voltage $V_{DC}$ so that, in the case of a recovery of the AC voltage $V_{AC}$ (as shown in FIG. 2 subsequent to the time $t_{11}$), the DC output voltage $V_{DC}$ would start out at approximately the same value as that which it had just prior to the recovery. That is, even though the AC voltage $V_{AC}$ may recover instantaneously (or otherwise in a very short period of time), the DC output voltage $V_{DC}$ does not recover at an excessive rate that could result in excessive inrush currents.

As is evident from FIG. 2, there is a discontinuity 275 in the value of the firing angle α at time $t_5$ in the example shown, although this is not necessarily the case and need not exist in alternate embodiments. The discontinuity 275 represents a safety margin between the actual DC output voltage $V_{DC}$ and the computed DC output voltage $V_{DC}$ that would occur in the event of a recovery of the AC voltage $V_{AC}$. The difference in both voltages determines the inrush current in the mentioned case, and is limited. In order to avoid calculation errors that could occur if the value of the variable B became too small (e.g., division by zero errors), the value of the variable B is limited in terms of its minimum value to 10% of the rated AC input line voltage.

The first threshold 280 is set at a level where, in the absence of the special control over the firing angle α provided by the present invention, a recovery of the AC voltage level 210 could result in excessive inrush currents. Typically, this level depends upon the normal level 220 of the DC output voltage $V_{DC}$ (or, in alternate embodiments, the normal level 210 of the AC voltage $V_{AC}$). For example, in one embodiment, the first threshold 280 would be set at half the value of the normal level 220, e.g., the first threshold 280 would be set to 100 Volts if the normal level 220 was 200 Volts, 200 Volts if the normal level was 400 Volts, 300 Volts if the normal level was 600 Volts, etc. In alternate embodiments, the first threshold 280 can be set to other levels depending on the semiconductor electrical characteristics which need to be protected, as is known to those of ordinary skill in the art. Also, instead of using a fixed threshold, any other mathematical function depending upon the above-mentioned sensed signals can, in alternate embodiments, be used by the controller to provide desired protection against excessive inrush currents.

Although dips in the AC voltage $V_{AC}$ can be of large enough magnitude, and last long enough, for the DC output voltage $V_{DC}$ to fall below the first threshold 280, most dips nevertheless are relatively short and the AC voltage $V_{AC}$ fully recovers to its normal level 210. In accordance with the present embodiment, if the AC voltage $V_{AC}$ recovers to at least a second threshold level 290 (subject to certain further considerations, as discussed below) subsequent to the time at which the first threshold 280 is breached by the DC output voltage $V_{DC}$, the controller 34 then from that time on operates to ramp the firing angle α upward toward the normal level 270. Thus, as shown in FIG. 2, once the second threshold level 290 is reached at time $t_{11}$, the firing angle α then is ramped up until it reaches the normal level 270 at time $t_{12}$. The controller 34 determines whether the AC voltage $V_{AC}$ has recovered above the second threshold level 290 by way of the sensing lines 37. The second threshold level 290 can be set at a variety of values depending upon the embodiment and, in the present embodiment, is set to 90% of the normal level 210.

As shown in FIG. 2, when the AC voltage $V_{AC}$ recovers, the DC output voltage $V_{DC}$ also recovers, at a rate that is at least in part determined by the ramping up of the fixing angle α. Further, the recovery of the DC output voltage $V_{DC}$ and ramping up of the firing angle α is typically accompanied by an increase in the input current $I_{IN}$. However, in the present embodiment, the ramping up of the firing angle α occurs at a rate that limits the rate of change in the DC output voltage $V_{DC}$ so that the input current $I_{IN}$ (which is dependent upon the rate of change in the DC output voltage $V_{DC}$) does not exceed the rated current level 250. As shown particularly in FIG. 2, the rate of increase of the firing angle α subsequent to time $t_{11}$ is such that the resulting rate of increase in the DC output voltage $V_{DC}$ is less than it would otherwise have been if the firing angle α had not been reduced (e.g., less than the rate of increase of the DC output voltage $V_{DC}$ shown subsequent to the time $t_{10}$), such that an excessive input current $I_{IN}$ does not occur. In the present embodiment, the firing angle α is increased at a rate of 0% to 100% in 200 milliseconds, which is sufficiently slow in most circumstances to guarantee that the input current $I_{IN}$ does not exceed the rated current level 250.

The present inventors have recognized (and the above discussion suggests) that the input current $I_{IN}$ that occurs during and immediately after a line dip depends primarily upon the stating point of the firing angle α when the AC input power returns to normal (or about normal) levels and also upon the manner in which the firing angle is increased subsequent to the recovery of the AC input power, which determines the rate of change of the DC output voltage $V_{DC}$ and (in the present embodiment) effectively limits that rate of change to the rate depicted subsequent to the times $t_7$ and $t_{11}$ shown in FIG. 2. However, as will be understood to those of skill in the art, the input current $I_{IN}$ also depends upon variety of other factors (at least some of which are uncontrollable) including, for example, the load, the capacitance of the connected capacitors 38, the DC choke 39, AC line voltage variations and imbalance as well as line inductance. Consequently, while the above formula used to calculate the firing angle α is usually satisfactory, in some alternate embodiments other formulas can be used to calculate the firing angle based upon additional information. Further, although not the case in the present embodiment, the controller 34 in some circumstances can be programmed with information or sense information concerning the load and related line inductance in order to more accurately calculate the values of the firing angle α to further guarantee that the inrush current does not exceed a maximum level such as the level 250.

The power converter 10 requires power for its own operation and, in the present embodiment (and at least some other embodiments), the power converter obtains power for its operation from the AC input power. Consequently, if the AC voltage $V_{AC}$ dips to an excessively low level, e.g., below a minimum level 300, insufficient power is being received for indefinite operation of the power converter 10. Because of the presence of an internal capacitor (not shown) within the controller 34, which stores a limited amount of power, the power converter 10 can continue to operate for a limited time period t_Cap even though the AC voltage $V_{AC}$ has dropped below the minimum level 300. As shown in FIG. 2, in order to extend the operation of the power converter 10 for as long as possible, the controller 34 stops firing the SCRs 12–22 whenever the AC voltage $V_{AC}$ falls below the minimum level 300, such as shown at time $t_6$, until such time as the AC voltage $V_{AC}$ recovers above minimum level 300, e.g. at a time $t_7$. In a similar embodiment, the load capacitor(s) 38 could be utilized to provide longer up-time of the controller 34.

Although, during such a "switch-off" period, the SCRs 12–22 are not fired, the controller 34 nevertheless continues to calculate the firing angle α as if the SCRs were still being fired. e.g., as shown by a dashed portion 310 of the curve representing the firing angle α. As with respect to the calculation of the firing angle α subsequent to the time $t_5$ discussed above, the firing angle α (subsequent to a time $t_{13}$ at which the DC output voltage $V_{DC}$ again falls below the first threshold 280) also is calculated by way of equation (1) until time $t_7$, at which the AC voltage $V_{AC}$ again recovers above the second threshold level 290, at which point the firing angle α is ramped back up to the normal level 270. That is, the calculation of th firing angle α involving equation (1) continues subsequent to time $t_6$ within the period 310. This is done so that a starting value of the firing angle α is available to the controller 34 at time $t_7$ when the controller must begin to ramp up the firing angle. In alternate embodiments, however, the calculation need not be continually performed after time $t_6$ and another method can be employed to identify a starting value for the firing angle at $t_7$.

If, however, the AC voltage $V_{AC}$ falls below the minimum level 300 and fails to recover above that minimum level (or, in alternate embodiments, fails to attain some other level such as the threshold 290) within the maximum allowable time t_Cap, the controller 34 first stops firing the SCRs 12–22 while continuing to determine the firing angle α as discussed above and then ultimately stops operating due to missing supply power after the maximum allowable time t_Cap has passed subsequent to the time at which the AC voltage $V_{AC}$ fell below the minimum level 300. The manner of calculation of the firing angle α depends upon whether the AC voltage $V_{AC}$ immediately dips below the minimum level 300 upon beginning its dip, or only dips below the minimum level at some time subsequent to the beginning of the dip (as shown at time $t_6$). If the former situation occurs, then the controller 34 immediately begins to recalculate the firing angle α by way of equation (1) even though the DC Output voltage $V_{DC}$ has not yet fallen below the first threshold 280. Then, once the maximum allowable time t_Cap has passed subsequent to the time at which the AC voltage $V_{AC}$ fell below the minimum level 300, then the power converter 10 shuts down and ceases operation.

If the latter situation occurs (that is, as shown subsequent to time $t_6$), then the controller 34 does not begin recalculating the firing angle α by way of equation (1) until the DC output voltage $V_{DC}$ has fallen below the first threshold 280. Once that occurs, then the controller begins recalculating the firing angle α using equation (1) and continues to do so even after the AC voltage $V_{AC}$ falls below the minimum level 300 (at which time the controller 34 ceases firing the SCRs 12–22). This continues until such time as the maximum allowable time t_Cap has passed subsequent to the time at which the AC voltage $V_{AC}$ falls below the minimum level. Once the maximum allowable time t_Cap has passed without the AC voltage $V_{AC}$ recovering above the minimum level 300, the power converter 10 shuts down and ceases calculating the firing angle α. In either case, when the power converter 10 shuts down, the power converter can only be restarted by hardware after the AC voltage $V_{AC}$ recovers above the level 300 to provide sufficient power to the controller and it can only start operating after recovery to the level 290 (or any other appropriately chosen value).

To summarize, in general, firing angle is always computed as long as the controller 34 is operating. Physical firing of the SCRs (or other switching devices) stops once the AC voltage $V_{AC}$ drops below the level 300. Additionally, the controller 34 shuts down after the passage of t_cap because it runs out of power. The value of t_cap is not sensed or noticed by the controller 34, but rather merely represents the amount of time that the controller 34 can operate without being supplied with additional power.

The present invention can vary from the embodiment discussed above with reference to FIGS. 1 and 2 in a variety of ways. For example, the present invention is applicable to AC-to-DC power converters that only convert one or two, or more than three, phases of AC power into DC power, as well as AC-to-DC power converters that convert any number of phase of AC power into more than one DC power output. Also, the present invention is applicable to a variety of AC-to-DC power converters that employ different components than those shown in FIG. 1 for performing power conversion and detecting power and related characteristics such as voltage, current, frequency, phase, etc. in relation to the AC input power and the DC output power. That is, for example, the control devices that are employed can vary from the controller 34 shown, and (as discussed above) the controlled switching devices that are employed can vary from the SCRs 12–22 shown to instead include other rectification devices such as Insulated Gate Bipolar Transistors (IGBTs), Gate Turn-offs, other semiconductor switching devices and other switching devices. Also, variations of the present invention are applicable to systems employing controlled switching devices that can be controlled to turn off instead of, or in addition to, being controlled to turn on.

Further the formula(s) employed to calculate the firing angle(s)/firing time instants of the controlled switching devices can vary from equation (1) and, indeed, multiple different formulas can be employed both with respect to the times at which the AC input power has dipped (or died entirely) and at times when the AC input power is recovering or has just recovered. Further, the particular thresholds and minimum/maximum/rated levels shown such as the first threshold 280, the minimum level 300, the second threshold level 290, and the rated current level 250 (as well as the maximum allowable time t_Cap) can vary depending upon the embodiment. For example, the second threshold level 290 could be set to three-quarters of the normal level 210.

Also, while it is a threshold level pertaining to the DC voltage that (in the above-discussed embodiments) triggers modification of the firing angle, in alternate embodiments the behavior of the AC voltage or other characteristic(s) of the input or output power that could serve as the "warning" that there is a risk of significant inrush currents and trigger modification of the firing angle. Likewise, while it is a threshold level pertaining to the AC voltage that (in the above-discussed embodiments) triggers the returning of the control signal to its normal levels, in alternate embodiments, other triggers could be employed.

Also, in certain alternate embodiments, other mathematical functions are employed to determine the firing angle adjustments rather than the thresholds, equations, and linear ramping (subsequent to recovery of the AC input power) discussed above. For example, the ramping up of the firing angle could proceed in accordance with a nonlinear function. Also, for example, instead of employing thresholds to determine whether the firing angle should be adjusted following a dip in the AC input power, a linear or nonlinear (or other mathematical) function could be employed to adjust the firing angle based upon the difference between the AC input power and some target level. Further, as discussed above, control over firing angles is equivalent to controlling the specific time instants at which the controlled switching devices are switched on or off. Thus, the present method can also be employed in power converters where the controlled switching devices are turned on and off at specific: time instants.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. A method of converting AC power into DC power, the method comprising:
    receiving the AC power;
    converting the AC power into the DC power by way of a rectification device, wherein the rectification device is capable of being controlled to switch on at a plurality of time instants;
    experiencing a first reduction in a first characteristic of the received AC power and a second reduction in a second characteristic of the DC power;
    changing at least one of the time instants at which the rectification device is to be switched on; and
    wherein the at least one time instant is changed when at least one of the first and second reductions is sufficiently large that an increase in at least one of the first and second characteristics could result in an excessive input current.

2. The method of claim 1, wherein the rectification device is selected from at least one of a power thyristor/silicon-controlled rectifier (SCR), an Insulated Gate Bipolar Transistor (IGBT), a Gate Turn-off, and a semiconductor switching device.

3. The method of claim 1, wherein each of the time instants corresponds to a respective firing angle value for a respective period associated with the AC power, and wherein the changing of the time instants corresponds to variations in the respective firing angle values at different periods.

4. The method of claim 3, wherein the firing angles values are changed when the second reduction is such that the second characteristic falls below a first threshold.

5. The method of claim 4, further comprising:
    returning the firing angle values to a progressively toward a normal level after the first characteristic increases above a second threshold.

6. The method of claim 5, wherein the returning of the firing angle values toward the normal level is graduated in at least one of a linear manner and a nonlinear manner, so that an inrush current output does not exceed a maximum threshold as the returning occurs.

7. The method of claim 5, wherein the first characteristic is an RMS voltage of at least one of three phases of the received AC power, and wherein the second characteristic is a rectified voltage of the DC power.

8. The method of claim 7 wherein, after the second characteristic has fallen below the first threshold and until the first characteristic has attained the second threshold, the firing angle is calculated based upon at least one of the RMS voltage and the rectified voltage of the DC power.

9. The method of claim 8, wherein the firing angle values are calculated at least in part based upon the ratio of the rectified voltage to the RMS voltage, and wherein the RMS voltage used for the calculation is limited to a minimum value.

10. The method of claim 5, wherein the returning only occurs if an increase of the first characteristic above at least one of the second threshold and a third threshold occurs within a first time period following an occurrence of the first characteristic falling below the third threshold.

11. The method of claim 5, wherein the rectification device ceases being switched on at the time instants specified by the firing angle values if the first characteristic falls below the third threshold.

12. The method of claim 4, wherein the rectification device and a controller controlling the rectification device are shut down if the first characteristic falls below a third threshold and does not rise above at least one of the third threshold and the second threshold within a maximum amount of time.

13. The method of claim 12, wherein the first threshold is determined based upon at least one sample of the second characteristic that has been heavily sampled, wherein the second threshold is a 90% of a normal level of an RMS voltage corresponding to the received AC power, and wherein the third threshold is less than 50% of the normal level of the RMS voltage.

14. The method of claim 3, wherein the firing angles values are varied changed in accordance with at least one of a linear, nonlinear and general mathematical function based upon at least one of the first characteristic, the second characteristic and a third characteristic.

15. A power conversion apparatus comprising:
    an AC power input port;
    a DC power output port;
    a rectification component coupled between the AC power input port and the DC power output port, wherein the rectification component includes at least one switchable device that is capable of being controlled to switch on at a plurality of time instants;
    a control device coupled to the rectification component that determines the time instants and controls the switching on of the at least one switchable device to occur at the determined time instants;
    wherein the control device receives information concerning a first characteristic of the AC power input and a second characteristic of the DC power output;

wherein the control device adjusts the time instants at which the switching on of the switchable device occurs; and wherein the control device adjusts the time instants when the control device determines that at least one of the first and second characteristics has varied sufficiently that there is a risk of an excessive inrush current being drawn from an AC source and provided at the DC power output port.

16. The power conversion apparatus of claim 15, wherein the control device determines the time instants as firing angle values.

17. The power conversion apparatus of claim 16, wherein the control device adjusts the firing angle values when the control device determines that the second characteristic of the DC output power has satisfied a first test.

18. The power conversion apparatus of claim 17, wherein the control device causes the firing angle values to return to a normal value after the control device determines that the first characteristic has satisfied a second test.

19. The power conversion apparatus of claim 18, wherein the firing angle is returned to the normal value in a graduated manner so that an inrush current does not exceed a maximum level as the returning occurs.

20. The power conversion apparatus of claim 17, wherein the control device is configured to stop switching on the switchable device if the first characteristic satisfies an additional test, and further shuts down the power conversion apparatus if the first characteristic fails to rise above a minimum level within a maximum allowable time.

21. The power conversion apparatus of claim 16, wherein the power conversion apparatus is configured to convert first, second and third phases of AC power into DC power, and further comprising second, third, fourth, fifth and sixth switchable devices, each of which is controlled to switch on at a respective firing time instant by the control device.

22. The power conversion apparatus of claim 21, wherein each of the switchable devices is selected from the group consisting of a power thyristor/silicon-controlled rectifier, an Insulated Gate Bipolar Transistor (IGBT), a Gate Turn-off, and a semiconductor switch.

23. The power conversion apparatus of claim 16, wherein the control device includes a sensing means for sensing a first quantity related to the first characteristic and for sensing a second quantity related to the second characteristic.

24. A system for converting AC power to DC power comprising:

a rectifier configured to receive AC power at an input and having at least one switch controllable to convert the AC power to DC power provided to an output of the rectifier; and a controller configured to monitor at least one of the input and the output of the rectifier and identify a reduction in the AC power in excess of a threshold and, in response to identifying the reduction in the AC power in excess of the threshold, adjust a switching time of the at least one switch to control an amount of inrush current permitted upon a recovery of the AC power following the reduction in AC power in excess of the threshold.

25. The system of claim 24 wherein the controller is further configured to adjust a firing angle of the at least one switch to limit the amount of inrush current generated upon a recovery of the AC power following the reduction in the AC power.

26. The system of claim 24 wherein the controller is further configured to monitor at least one of the input and the output of the rectifier for a voltage indicative of the recovery from the reduction in the AC power.

27. The system of claim 26 wherein the voltage indicative of the recovery is at least three-quarters of a voltage prior to the reduction in the AC power.

28. The system of claim 26 wherein the controller is further configured to advance a switching-on time of the at least one switch from a normal switching-on time upon identifying the reduction in the AC power.

29. The system of claim 28 wherein the controller is further configured to return the switching-on time of the at least one switch to the normal switching-on time following the recovery from the reduction in the AC power.

30. The system of claim 28 wherein the controller is further configured to incrementally move the switching-on time of the at least one switch toward the normal switching-on time following an at least partial recovery from the reduction in the AC power.

31. The system of claim 30 wherein the controller is further configured to move the switching-on time in a nonlinear progression toward the normal switching-on time to maintain a current delivered at the output below a threshold.

* * * * *